United States Patent
College

(10) Patent No.: US 8,074,485 B2
(45) Date of Patent: Dec. 13, 2011

(54) TOOL HEAD ASSEMBLIES FOR PRESSING DEVICES

(75) Inventor: David Alan College, Annville, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 566 days.

(21) Appl. No.: 12/330,283

(22) Filed: Dec. 8, 2008

(65) Prior Publication Data
US 2010/0005849 A1    Jan. 14, 2010

Related U.S. Application Data

(60) Provisional application No. 61/134,205, filed on Jul. 8, 2008.

(51) Int. Cl.
*B21J 9/18* (2006.01)
*B21D 7/06* (2006.01)

(52) U.S. Cl. .............. 72/453.15; 72/416; 72/453.16; 100/266

(58) Field of Classification Search .............. 72/407, 72/409.14, 416, 453.03, 453.15, 453.16; 100/266
See application file for complete search history.

(56) References Cited

U.S. PATENT DOCUMENTS

| | | | | |
|---|---|---|---|---|
| 2,962,074 | A | * | 11/1960 | Dupre et al. ............... 72/434 |
| 4,132,107 | A | * | 1/1979 | Suganuma et al. .......... 72/416 |
| 4,956,992 | A | | 9/1990 | Undin |
| 5,730,022 | A | | 3/1998 | Hansson et al. |
| 6,718,870 | B1 | | 4/2004 | Frenken |
| 7,254,982 | B2 | | 8/2007 | Frenken |
| 2007/0180887 | A1 | | 8/2007 | Frenken |
| 2007/0214860 | A1 | | 9/2007 | Frenken |

FOREIGN PATENT DOCUMENTS

DE    297 03 053    4/1997
FR    1 293 331    5/1962

OTHER PUBLICATIONS

International Search Report, International Application No. PCT/US2009/003864, International Filing Date, Jun. 30, 2009.

* cited by examiner

*Primary Examiner* — David Jones

(57) ABSTRACT

A tool head assembly for a pressing device includes a tool head frame having a first die and a moving ram having a second die operatively coupled to the moving ram. The moving ram is movable along a gripping stroke between an open position and a closed position. The second die is configured to hold a work piece between the second die and the first die when the moving ram is in the closed position. The tool head assembly also includes a latch mechanism, wherein the latch mechanism is actuated to release the moving ram from the open position to the closed position to thereby hold the work piece within the tool head assembly.

20 Claims, 6 Drawing Sheets

TOOL HEAD ASSEMBLIES FOR PRESSING DEVICES

CROSS REFERENCE TO RELATED APPLICATIONS

This application claims the benefit of U.S. Provisional Application No. 61/134,205 filed Jul. 8, 2008, titled "GRIPPING TOOL HEAD", the subject matter of which is herein incorporated by reference in its entirety.

BACKGROUND OF THE INVENTION

The subject matter herein relates generally to pressing devices, and more particularly, to tool head assemblies for pressing devices.

Pressing devices are employed in numerous applications to provide a user with a desired mechanical advantage. One exemplary application is in crimping tools used for making crimping connections, such as crimping terminals onto conductors. Another exemplary application is in cutting tools where the tool enables the user to apply a relatively large amount of force or pressure. In enabling such operations, it is generally desirable to provide a tool that can perform the desired operations, and is manageable as well. The pressing devices typically include a work head having tooling appropriate for the particular application, and an actuator coupled to the work head for driving the tooling. Hydraulic mechanisms are often employed in tool actuators. For example, the work head typically includes a fixed die and movable die that is hydraulically driven towards the fixed die to perform an operation. However, in some embodiments, the work head may have more than one movable die that are movable toward one another. The actuator includes a hydraulic pump that is operated to either directly or indirectly drive the movable die of the work head.

Some current pressing devices have work heads with tooling that simply close and open. For the example of a crimping tool, the terminal must be positioned and gripped in the proper location adjacent to the crimp tooling. If the tooling does not have a terminal locator, in order to grip the terminal, the tooling is advanced or closed and the operator must stop exactly when the movable die just touches the terminal. If the movable die is advanced too far, the terminal is already being crimped and it is difficult to insert a wire into the partially crimped terminal. With this type of pressing device, there is the advantage that the crimp terminal is immediately free when the jaws open.

One known design provided an improvement with tooling that is spring loaded closed. U.S. Pat. No. 5,730,022 shows one such embodiment. To use this type of tooling, the movable die must be manually moved apart to load the terminal. The spring loaded movable die is then released to hold the terminal, at which time the actuator could be actuated and the entire cycle completed without needing to stop the actuator at a specific point to grip the terminal. However, spring loaded closed type of pressing devices are not without disadvantages. For instance, the movable die of the tooling needs to be manually opened against the spring in order to release the crimped terminal. This extra process step adds time and complexity to the operation of the pressing device.

Other known designs are shown in U.S. Pat. No. 6,718,870 and U.S. Pat. No. 7,421,877. The movable die of the '870 and '877 pressing devices are jogged toward the fixed die of the tooling via the tool control trigger until the terminal is gripped. The pressing device provides a spring loaded portion of travel so that the crimp does not begin immediately when the tooling touches the terminal. However, the design of the '870 and '877 pressing device is not without problems. For example, it is still possible to close the tooling too far to get the wire in the terminal. Additionally, the tool stroke of the pressing device is made longer to take up the extra stroke of the spring loaded portion of stroke. Thus, with this pressing device design, it is difficult and time consuming to grip the terminal.

BRIEF DESCRIPTION OF THE INVENTION

In one embodiment, a tool head assembly is provided for a pressing device that includes a tool head frame having a first die and a moving ram having a second die operatively coupled to the moving ram. The moving ram is movable along a gripping stroke between an open position and a closed position. The second die is configured to hold a work piece between the second die and the first die when the moving ram is in the closed position. The tool head assembly also includes a latch mechanism, wherein the latch mechanism is actuated to release the moving ram from the open position to the closed position to thereby hold the work piece within the tool head assembly.

Optionally, the tool head assembly may include a gripping spring that is biased against the moving ram to force the moving ram along the gripping stroke when the latch mechanism is actuated. The gripping spring may hold the moving ram in the closed position. The tool head assembly may include a working piston having a central bore. The moving ram may be received in the central bore and may be movable with respect to the working piston along the gripping stroke. The working piston may be driven along a pressing stroke by the pressing device. Optionally, a working piston may be driven by the pressing device, wherein the working piston has a catch. The latch mechanism may engage the catch and may be released therefrom to release the moving ram along the gripping stroke. Optionally, a release may be coupled to the tool head frame, wherein the release has a distal end that engages the latch mechanism when pressed to actuate the latch mechanism. The moving ram may include a post. A spring-loaded plunger may drive the post. The tool head assembly may further include a retaining ring restricting movement of the plunger beyond the limits.

In another embodiment, a tool head assembly for a pressing device is provided that includes a tool head frame having a first die and a moving ram having a second die. The moving ram is movable between an open position and a closed position in which a work piece is held between the second die and the first die. The tool head assembly also includes a working piston having a central bore that receives the moving ram, wherein the moving ram is movable with respect to the working piston along the gripping stroke. The working piston is driven along a pressing stroke by the pressing device. A latch mechanism is coupled to the moving ram, wherein the latch mechanism engages the working piston at the end of the pressing stroke and remains engaged during a return portion of the pressing stroke to automatically move the moving ram to the open position.

In a further embodiment, a pressing device assembly is provided that includes an actuator extending to a mating end and having a working piston being driven along a pressing stroke. The pressing device assembly also includes a tool head assembly coupled to the mating end. The tool head assembly includes a tool head frame having a first die and a moving rain having a second die. The moving rain is movably coupled to the working piston, wherein the moving ram is movable between an open position and a closed position. The tool head assembly also includes a latch mechanism coupled to the moving ram, wherein the latch mechanism engages the working piston during a return portion of the pressing stroke to automatically move the moving ram to the open position.

DETAILED DESCRIPTION OF THE INVENTION

Figure 1:
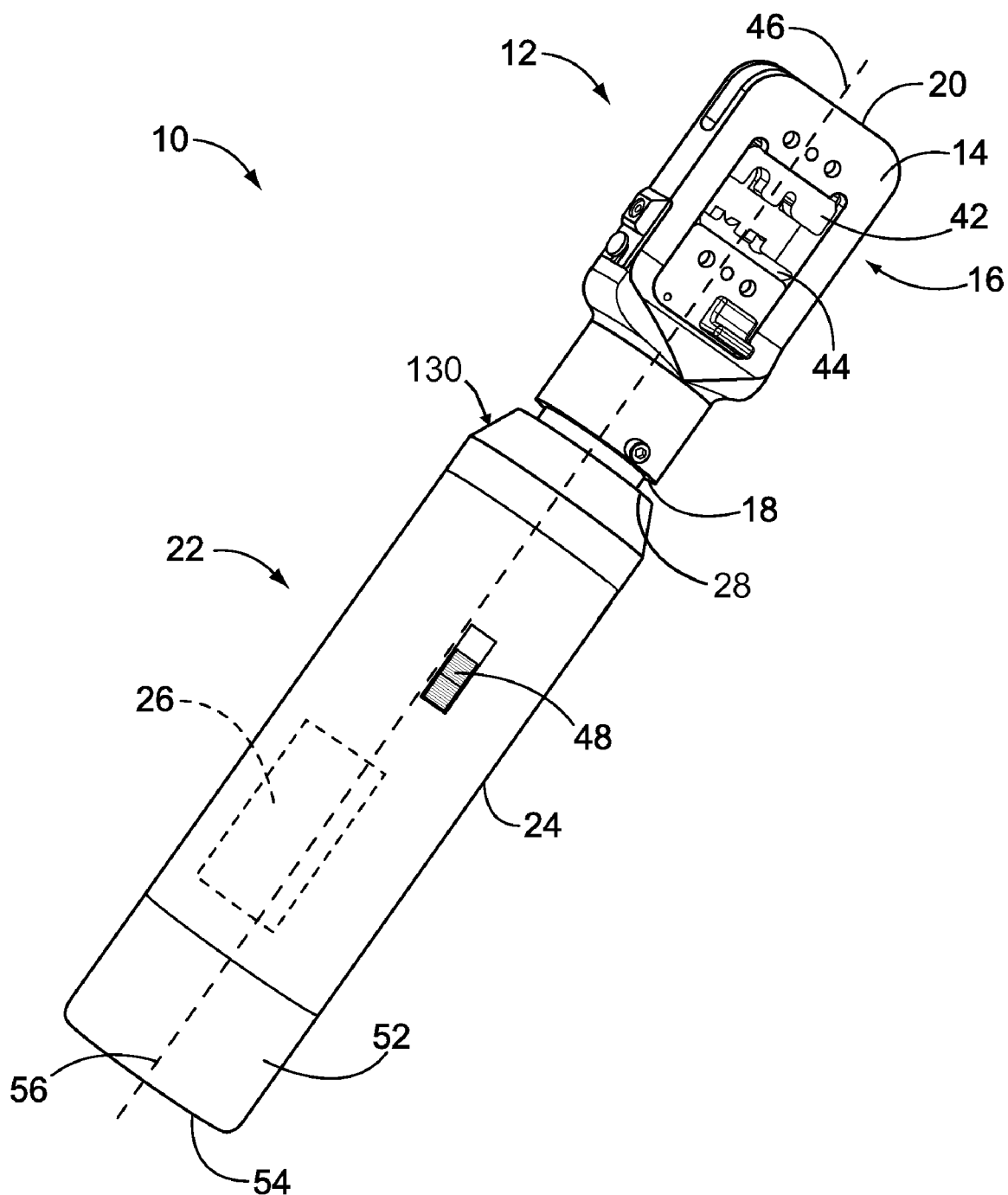
FIG. 1 illustrates an exemplary pressing device having a tool head assembly formed in accordance with an exemplary embodiment.

FIG. 1 illustrates an exemplary electrohydraulic pressing device 10 having a tool head assembly 12 formed in accordance with an exemplary embodiment. The tool head assembly 12 has a tool head frame 14 holding tooling 16. The tool head assembly 12 includes a mating end 18 opposite to a head end 20. The pressing device 10 also includes an actuator 22 having an actuator body 24 holding a hydraulic pump 26 (shown in phantom) that is operable to drive the tooling 16. The actuator 22 has a mating end 28. Optionally, the mating end 28 may be at an end of the actuator body 24. Alternatively, the mating end 28 may be at an end of a hydraulic hose (not shown) connected to the actuator body 24. The tool head assembly 12 is coupled to the mating end 28 of the actuator 22. The actuator 22 may utilize an alternative actuating means or device other than the hydraulic pump 26 in alternative embodiments, such as a screw driven by an electric motor. The hydraulic pump 26 is merely illustrative of an exemplary embodiment of an actuator, component and the actuator 22 is not intended to be limited to using a hydraulic pump 26.

The tool head frame 14 holds the tooling 16 at the head end 20. Optionally, the tooling 16 may be separate from the tool head frame 14 and coupled to the tool head frame 14. The tooling 16 may include a fixed die 42 and a movable die 44 that is movable with respect to the fixed die 42. Optionally, the tooling may include multiple movable dies or components that are movable toward one another. The tool head frame 14 may be coupled to the actuator body 24 such as by a threaded connection. In the illustrated embodiments the fixed and movable die 42, 44 represent crimp tooling for crimping a terminal to an end of a wire. Other types of tooling may be used in alternative embodiments, such as cutting tooling. The fixed and/or movable dies 42, 44 may be removed from the tool head frame 14 to replace damaged tooling and/or to utilize different types, sizes and/or shaped tooling. Alternatively, the tool head frame 14 may be removed from the actuator 22 and replaced with a different tool head frame having tooling with a different type or different sized and/or shaped tooling.

The tool head frame 14 is generally cylindrical in shape at the mating end 18 for rotational threading to the actuator body 24, however the tool head frame 14 may have other shapes in alternative embodiments. The tool head frame 14 is generally rectangular in shape at the head end 20, however the tool head frame 14 may have other shapes in alternative embodiments.

The tool head frame 14 extends along a longitudinal axis 46 extending between the mating end 18 and head end 20. Optionally, the movable die 44 may be moved in a driven direction generally along the longitudinal axis 46 during operation.

In an exemplary embodiment, an operation switch 48 may be provided on an outer surface of the actuator 22. The operation switch 48 controls the operation of the pressing device 10. For example, the operation switch 48 may be moved between an ON position and an OFF position wherein the movable die 44 is driven towards the fixed die 42 when the operation switch 48 is moved to the ON position. Optionally, the operation switch 48 may be provided on the tool head frame 14 rather than the actuator 22.

The actuator 22 includes the hydraulic pump 26 within the actuator body 24. The hydraulic pump 26 is operatively connected to a power source 52 at a base end 54. Optionally, the power source 52 may be a battery. Alternatively, the power source 52 may be an AC power source with a cord extending from the base end 54 of the actuator 22. The hydraulic pump 26 forms part of a hydraulic circuit that is used to actuate the tooling 16. In an exemplary embodiment, the pressing device 10 is an electrohydraulic pressing device wherein the hydraulic pump 26 is control led by an electric motor that is powered by the power source 52.

The actuator body 24 is generally cylindrical in shape, however the actuator body 24 may have other shapes in alternative embodiments. For example, the shape of the actuator body 24 may be contoured to fit within an operator's hand. The actuator body 24 may be angled to balance or otherwise distribute the weight of the actuator body 24. The actuator body 24 extends along a longitudinal axis 56 extending between the mating end 28 and the base end 54. A coupler 130 may be provided at the mating end 28 of the actuator 22 for the purpose of attaching the working head 12.

Figure 2:
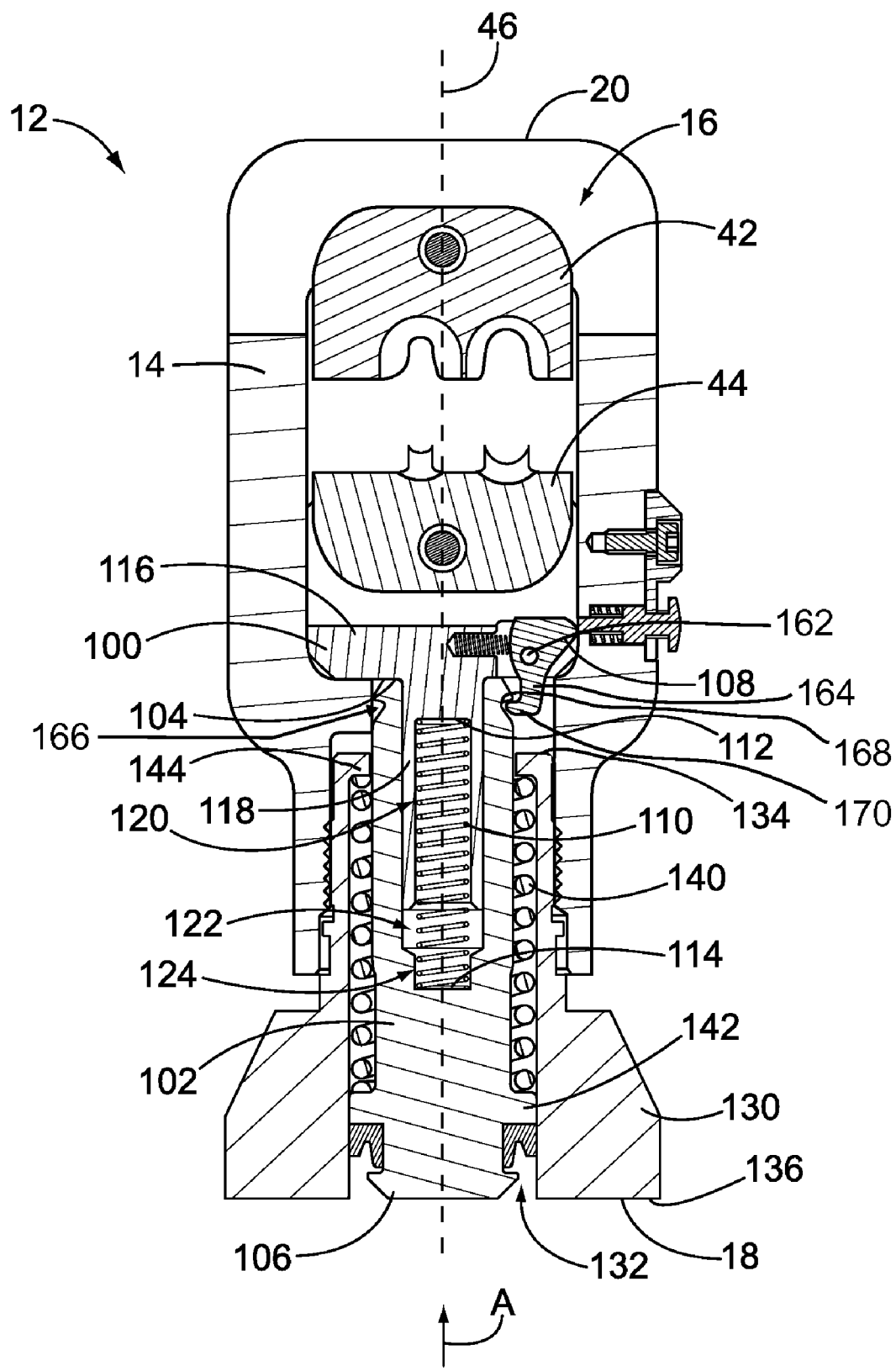
FIG. 2 is a cross-sectional view of the tool head assembly shown in FIG. 1.

FIG. 2 is a cross-sectional view of the tool head assembly 12 illustrating the fixed die 42 and the movable die 44 in an initial position. Components from the mating end 28 of the actuator 22 are also shown. The tool head frame 14 holds the fixed die 42 in a fixed positioned relative thereto. The movable die 44 is movable with respect to the tool head frame 14. In an exemplary embodiment, the tool head assembly 12 includes a moving ram 100 operatively coupled to the movable die 44. The moving ram 100 is movable between an open position (shown in FIG. 2) and a closed position (shown in FIG. 3), in which a work piece (not shown), such as a terminal, is held between the movable die 44 and the fixed die 42. As will be described in further detail below, the closed position may be represented by a range of positions including a gripping position, in which the work piece is held by a light force, such as a spring force, and a pressed position, in which a pressing operation has been performed on the work piece. In operation, as the moving ram 100 is moved from the open position to the closed position, the moving ram 100 forces the movable die 44 towards the fixed die 42. Optionally, the moving ram 100 may directly engage the movable die 44. Alternatively, a linking element (not shown) may be provided between the moving ran 100 and the movable die 44 to force the movable die 44 towards the fixed die 42 as the moving ram 100 is moved to the closed position.

In an exemplary embodiment, the tool head assembly 12 includes a working piston 102 that receives the moving ram 100. As will be described in further detail below, the working piston 102 is driven along a pressing stroke by the pressing device. The working piston 102 is driven forward toward the tool head end 20 by a pressing device during the pressing stroke, which is represented by an arrow A that extends generally along the longitudinal axis 46. The working piston 102 includes a head end 104 and a base end 106. The actuator 22 (shown in FIG. 1) engages, and drives, the base end 106. In an exemplary embodiment, pressurized hydraulic fluid from the actuator 22 urges the piston 102 forward. As will be described in further detail below, the head end 104 engages the moving ram 100, and drives the moving ram 100 through the pressing stroke. The moving ram 100 in turn drives the movable die 44 along the pressing stroke.

The tool head assembly 12 includes a latch mechanism 108 that is coupled to the moving ram 100. The latch mechanism 108 engages the working piston 102 to hold the moving ram 100 in position with respect to the working piston 102. Optionally, the moving ram 100 may be held against the head end 104 when the latch mechanism 108 engages the working piston 102. Alternatively, a space may be provided between the moving ram 100 and the head end 104. In an exemplary embodiment, the moving ram 100 is movable with respect to the working piston 102. The latch mechanism 108 is actuated to release the moving ram 100 from the working piston 102. When the latch mechanism 108 is actuated, the moving ram 100 is released from the open position, along a gripping stroke, to the closed position to thereby hold the work piece within the tool head assembly 12. The moving ram 100 moves in a gripping direction during the gripping stroke which is generally shown by the arrow A.

In an exemplary embodiment, the tool head assembly 12 includes a gripping spring 110 positioned between the moving ram 100 and the working piston 102. The gripping spring 110 includes a first end 112 that engages the moving ram 100 and the gripping spring 104 includes a second end 114 that engages the working piston 102. When the moving ram 100 is in the open position, the gripping spring 110 is generally compressed. When the latch mechanism 108 is actuated, as will be described in further detail below, the gripping spring 110 extends and generally forces the moving ram 100 along the gripping stroke to the closed position. In an exemplary embodiment, the moving ram 100 includes a head 116 and a base 118. The base 118 includes a spring bore 120 open at an end that receives the gripping spring 110. Optionally, the working piston 102 may include a central bore 122 that receives the base 118 of the moving ram 100. The bottom of the central bore 122 may also include a spring bore 124 that receives the second end 114 of the gripping spring 110. The spring bores 120, 124 may capture the ends 112, 114 of the gripping spring 110.

The tool head assembly 12 may also include a coupler 130 at the mating end 18. In some embodiments, the coupler 130 may form a portion of, or be coupled to, the actuator 22. The tool head frame 14 is attached to the coupler 130. Optionally, the tool head frame 14 may be threadably coupled to the coupler 130. Alternative coupling means and/or features may be provided in alternative embodiments to attach the tool head frame 14 to the coupler 130. The coupler 130 includes a central cavity 132 having open ends 134, 136. The working piston 102 is received within the central cavity 132 and extends through the end 134. In an exemplary embodiment, the working piston 102 is driven by hydraulic pressure from the actuator 22. For example, hydraulic fluid may be forced into the cavity 132 to drive the working piston 102. Alternatively, another drive component (not shown), such as a piston, may extend into the central cavity 132 to engage and drive the working piston 102.

A return spring 140 circumferentially surrounds the body of the working piston 102. The return spring 140 is captured between a flange 142 of the working piston 104 and a cap 144 of the coupler 130 at the end 134 thereof. As the working piston 102 is driven along the pressing stroke, the return spring 140 is compressed. Optionally, when the pressing pressure of the pressing device 10 on the working piston 102 is released, such as when the pressing stroke is completed, the return spring 140 generally forces the working piston 102 back to a retracted position, such as the position illustrated in FIG. 2.

Figure 3:
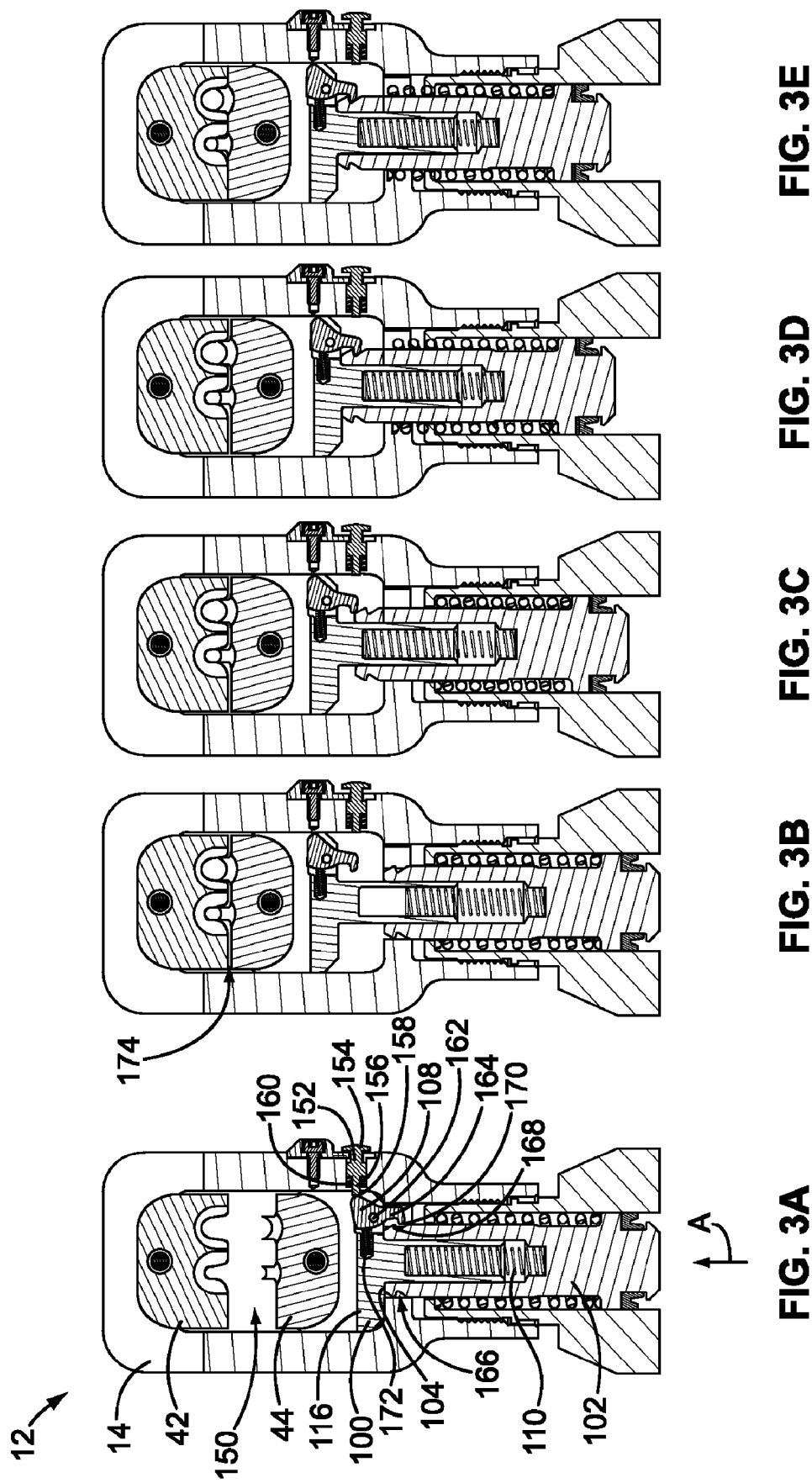
FIGS. 3A-E illustrates the tool head assembly in various operation stages thereof.

FIG. 3 illustrates the tool head assembly 12 and a mating portion of the actuator 22 in various operation stages thereof FIG. 2 generally illustrates the tool head assembly 12 in an initial position, which is a normal operation position of the pressing device 10 prior to operation, wherein the moving ram 100 is in the open position and the working head piston 102 is in the retracted position. FIG. 3 generally illustrates the tool head assembly 12 in various stages of operation, defined herein by stages A-E, where stage A represents a latch mechanism release stage; stage B represents a closed gripping stroke stage; stage C represents an initial pressing stroke stage; stage D represents an intermediate pressing stroke stage; and stage E represents a final pressing stroke stage. The stages of operation illustrated in FIG. 3 are merely exemplary stages. The pressing device 10 may be operated differently and other stages may supplement or replace the illustrated stages.

Generally speaking, in operation, the operator initially holds the pressing device 10 with one hand and the work piece with the other hand. The work piece is placed in a space 150 defined between the fixed die 42 and the movable die 44. The work piece may be a terminal, a wire and/or another component. Once the work piece is positioned within the space 150, the operator releases the latch mechanism 108 by pressing a release 152, an example of which is represented at stage A.

In the illustrated embodiment, the release 152 is represented by a pushbutton having a tab 154 and a pin 156 extending from the tab to a distal end 158. Optionally, the release 152 is spring biased by a spring 160. The release 152 extends through the tool head frame 14 and is generally aligned with the latch mechanism 108. Pressing the release 152 actuates the latch mechanism 108 and releases the latch mechanism 108 from the working piston 102. In an exemplary embodiment, and with reference back to FIG. 2, the latch mechanism 108 may be pivoted about a pivot point 162. When pivoted, a latch arm 164 of the latch mechanism 108 is pulled away from the working piston 102 and disengages from a circumferential groove 166 that surrounds the working piston 102 proximate to the head end 104. The outer surface of the groove 166 may define a catch 168 for holding the latch mechanism 108 therein. The catch 168 may have a complementary shape to a tip 170 of the latch arm 164. Optionally, the catch 168 may be slightly angled to retain the latch mechanism 108. In an exemplary embodiment, a spring 172 engages the latch mechanism 108 and generally forces the latch mechanism 108 to a latched position, such as the position illustrated in FIG. 2. The release 152 overcomes the force of the spring 172 when the release 152 is pressed.

When the latch mechanism 108 is moved to the released position, the moving ram 100 is capable of moving with respect to the working piston 102. For example, the moving ram 100 may be forced along the gripping stroke by the gripping spring 110 to the closed position. However, when the latch mechanism 108 is in the latched position, the latch mechanism 108 holds the moving ram 100 in position relative to the working piston 102, such as in the open position. In the illustrated embodiment, the moving ram 100 is illustrated in the open position at stage A, and is illustrated in the closed position at stage B.

In the closed gripping stroke stage (stage B), the gripping spring 110 extends and forces the moving ram 100 to the closed position, which may represent a gripping position. In the closed position, the movable die 44 is positioned proximate to the fixed die 42. The fixed and movable dies 42, 44 hold the work piece (not shown) therebetween by a gripping force imparted by the gripping spring 110. Optionally, the gripping force may be a light spring force enough to hold the work piece in position with respect to the fixed and multiple dies 42, 44.

In operation, the tool head assembly 12 is transferred from the initial or normal position illustrated in FIG. 2 to the closed gripping stroke stage when the operator presses the release 152. For example, when the release 152 is pressed, the moving ram 100 is automatically moved to the closed position to hold the work piece. At this stage, the working piston 102 remains in a retracted position. However, when the operator presses the operation switch 48 (shown in FIG. 1), the pressing stroke of the working piston 102 begins. The working piston 102 progresses through the pressing stroke, represented by the stages C-E, and finally progresses through a return stroke in which the working piston 102 returns to the retracted position. As described in further detail below, the latch mechanism 108 engages the working piston 102 at the end of the pressing stroke and remains engaged during a return portion of the pressing stroke to automatically move the moving ram 100 to the open position.

In the initial pressing stroke stage (stage C), the working piston 102 is driven towards the head 116 of the moving ram 100. At some point during the pressing stroke, the working piston 102 engages the latch arm 164. Optionally, the working piston 102 may force the latch mechanism 108 outward as the working piston 102 is driven along the pressing stroke towards the head 116 of the moving ram 100. In the intermediate pressing stroke stage (stage D), the head end 104 engages the head 116 of the moving ram 100. When the head end 104 engages the moving ram 100, the latch mechanism 108 engages the catch 168. Further pressing of the working piston 102 drives the moving ram 100 in the pressing direction, shown in FIG. 3 by the arrow A. For example, the working piston 102 may drive the moving ram 100 in the pressing direction to a pressed position, such as the position represented in the final pressing stroke stage (stage E).

In the final pressing stroke stage (stage E), the working piston 102 drives the moving ram 100 along a pressing stroke. The moving ram 100 in turn drives the movable die 44 along the pressing stroke. Depending on the particular application, the fixed and movable dies 42, 44 perform a pressing operation on the work piece. For example, during a crimping application, the fixed and movable dies 42, 44 may crimp a terminal to a wire. During a cutting application, the fixed and movable dies 42, 44 may cut a terminal, a wire or another component. As illustrated in FIG. 3, prior to the final pressing stroke stage, a gap 174 may exist between the fixed and movable dies 42, 44. For example, the movable die 44 may engage the work piece prior to engaging the fixed die 42 and may be held away from the fixed die 42. During the pressing stroke, as the working piston 102 is moved to the final pressing stroke stage, the movable die 44 manipulates the work piece to change it shape allowing the movable die 44 to move relatively closer to the fixed die 42.

Once the pressing stroke is complete, or as the last portion or the pressing stroke, the working piston 102 is returned to the retracted position, such as the position shown at the initial stage (shown in FIG. 2). Optionally, as the pressure applied to the working piston 102 is released, the return spring 140 forces the working piston 102 to return to the retracted position. Alternatively, the pressing device 10 may actively pull the working piston 102 back to the retracted position. As the working piston 102 is returned to the retracted position, the latch mechanism 108, which is coupled to the moving ram 100, pulls the moving ram 100 away from the fixed die 42. The moving ram 100 thus returns the movable die 44 to the open position. The tool head assembly 12 is then ready to receive another work piece between the fixed and movable dies 42, 44.

Figure 4:
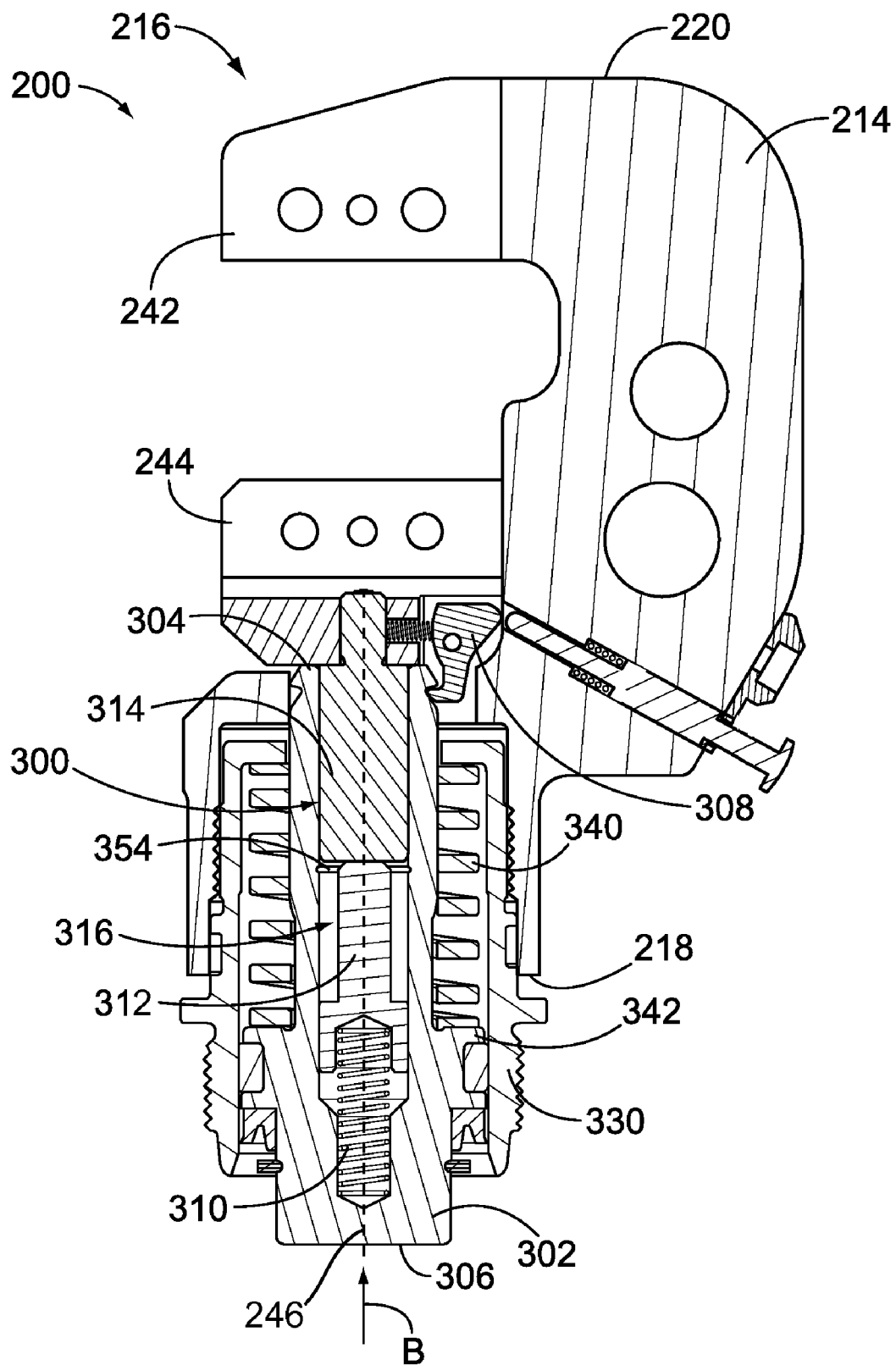
FIG. 4 is a cross-sectional view of an alternative tool head assembly for the pressing device.

FIG. 4 is a cross-sectional view of an alternative tool head assembly 200 for the pressing device 10 (shown in FIG. 1). The tool head assembly 200 is similar to the tool head assembly 12 illustrated in FIG. 1, however the tool head assembly 200 represents an open head design, as opposed to the closed head design of the tool head assembly 12.

The tool head assembly 200 has a tool head frame 214 holding tooling 216. The tool head assembly 200 includes a mating end 218 opposite to a head end 220. The tooling 216 includes a first jaw 242 and a second jaw 244 that is movable with respect to the first jaw 242. Tools such as crimping dies, cutting dies or pressing dies may be mounted to the first and second jaws 242, 244. One or both of the jaws 242, 244 may be movable with respect to one another to accomplish a pressing action.

The tool head assembly 200 includes a moving ram 300 operatively coupled to the second jaw 244. Optionally, the moving ram 300 may include the second jaw 244. The second jaw 244 may be integrally formed with the moving ram 300. The moving ram 300 is movable between an open position (shown in FIG. 4) and a closed position, in which a work piece, such as a terminal, is held between the second jaw 244 and the first jaw 242.

In an exemplary embodiment, the tool head assembly 200 includes a working piston 302 from the actuator 22 that receives the moving ram 300. As will be described in further detail below, the working piston 302 is driven along a pressing stroke by the pressing device 10. The working piston 302 is driven in a pressing direction during the pressing stroke, which is represented by an arrow B that extends generally along a longitudinal axis 246. The working piston 302 includes a head end 304 and a base end 306. The head end 304 engages the moving ram 300 and drives the moving ram 300 through the pressing stroke. The moving ram 300 in turn drives the second jaw 244 along the pressing stroke.

The tool head assembly 200 includes a latch mechanism 308 that is coupled to the moving ram 300. The latch mechanism 308 engages the working piston 302 to hold the moving ram 300 in position with respect to the working piston 302. Optionally, the moving ram 300 may be held against the head end 304 when the latch mechanism 308 engages the working piston 302. Alternatively, a space may be provided between the moving ram 300 and the head end 304. In an exemplary embodiment, the moving ram 300 is movable with respect to the working piston 302. The latch mechanism 308 is actuated to release the moving ram 300 from the working piston 302. When the latch mechanism 308 is actuated, the moving ram 300 is released from the open position, along a gripping stroke, to the closed position to thereby hold the work piece within the tool head assembly 200.

In an exemplary embodiment, the tool head assembly 200 includes a gripping spring 310 positioned between the moving ram 300 and the working piston 302. When the moving ram 300 is in the open position, the gripping spring 310 is generally compressed. When the latch mechanism 308 is actuated, the gripping spring 310 extends and generally forces the moving ram 300 along the gripping stroke to the closed position.

In an exemplary embodiment, the tool head assembly 200 includes a plunger 312 and a post 314. The post 314 may form part of the moving ram 300. The post 314 engages the second jaw 244. Optionally, the post 314 may be secured to the second jaw 244 by a compression or friction fit. Other securing means or features may be used in alternative embodiments, such as adhesive or fasteners. Optionally, the post 314 may be integrally formed with the second jaw 244. The plunger 312 is positioned between the gripping spring 310 and the post 314. The plunger 312 drives the post 314. Optionally, the working piston 302 may include a central bore 316 that receives the plunger 312 and/or the post 314.

The tool head assembly 200 may also engage a coupler 330 at the mating end 218. The tool head frame 214 is attached to the coupler 330 which may be part of the actuator 22. Optionally, the tool head frame 214 may be threadably coupled to the coupler 330. The working piston 302 is received within the coupler 330. A return spring 340 circumferentially surrounds the body of the working piston 302. The return spring 340 is captured between a flange 342 of the working piston 304 and the coupler 330. As the working piston 302 is driven along the pressing stroke, the return spring 340 is compressed. Optionally, when the pressing pressure of the pressing device 10 on the working piston 302 is released, such as when the pressing stroke is completed, the return spring 340 generally forces the working piston 302 back to a resting position.

Figure 5:
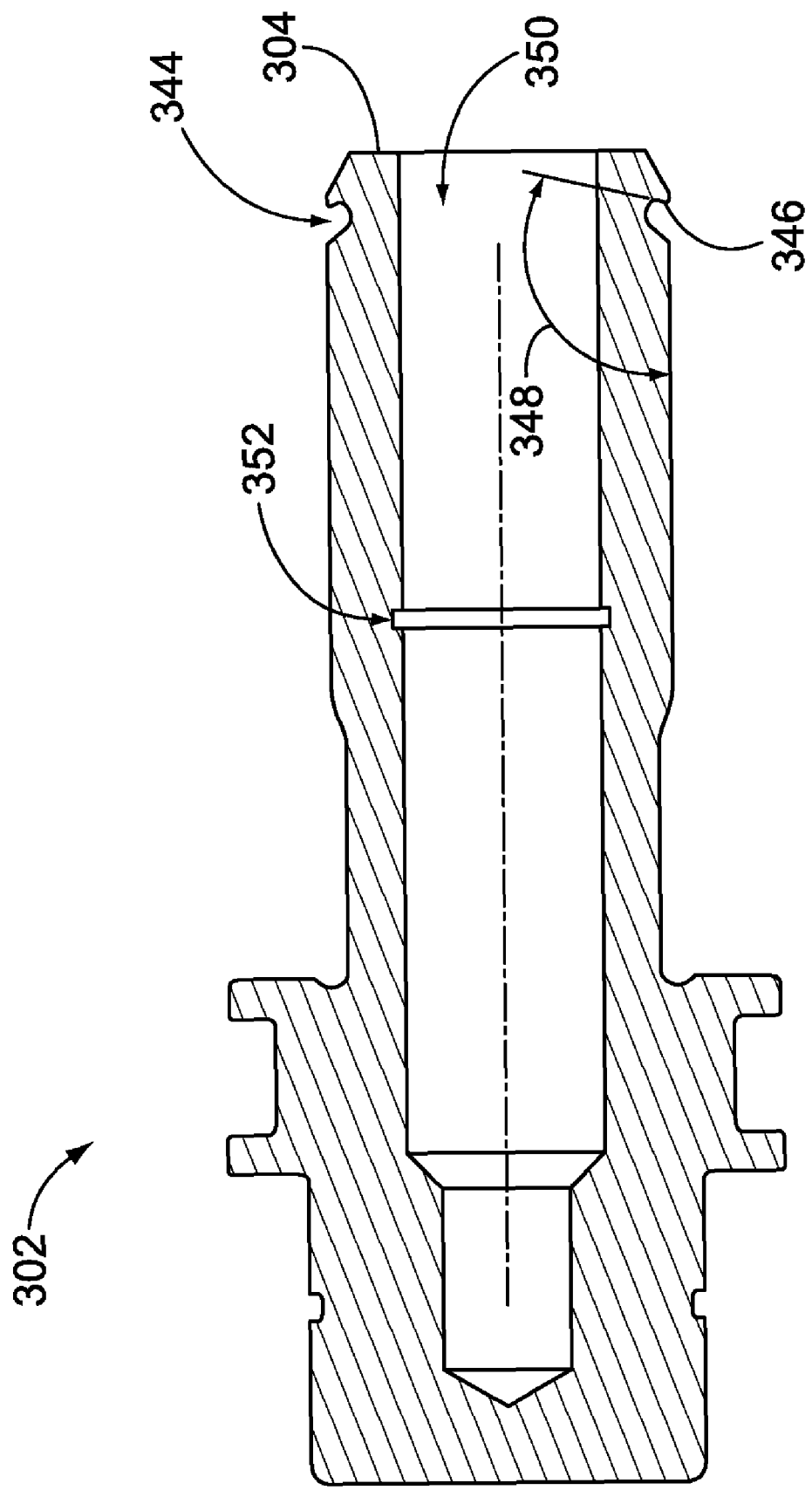
FIG. 5 is a cross-sectional view of a working piston for the tool head assembly shown in FIG. 4.

FIG. 5 is a cross-sectional view of the working piston 302. FIG. 5 illustrates a circumferential groove 344 that surrounds the working piston 302 proximate to the head end 304. A forward surface of the groove 344 defines a catch 346 for holding the latch mechanism 308. Optionally, the catch 346 may be approximately perpendicular to the central axis extending along the working piston 302. The catch 346 may be angled slightly forward from the outer edge to help retain the latch mechanism 308. For example, the catch 346 may be angled in an angle 348 that is greater than 90°, which may create a lip that receives the latch mechanism 308.

In an exemplary embodiment, a central bore 350 of the working piston 302 may include an annular recess 352 proximate to the middle of the central bore 350. The recess 352 is size and shaped to receive a retaining ring 354 (shown in FIG. 4). The retaining ring 354 restricts movement of the plunger 312 beyond the retaining ring 354. The retaining ring 354 thus operates as a travel limit for the plunger 312.

Figure 6C:
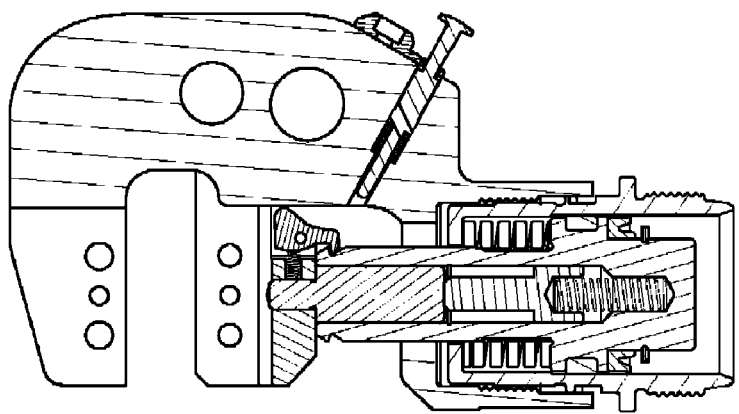
FIGS. 6A-C illustrates the tool head assembly shown in FIG. 4 in various operation stages thereof.
Figure 6B:
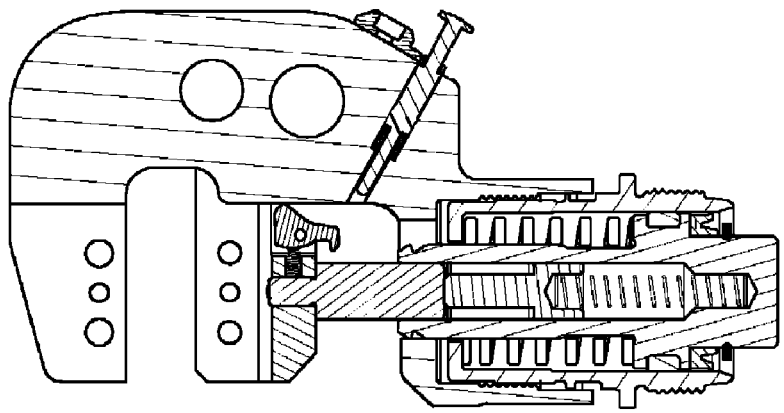
Figure 6A:
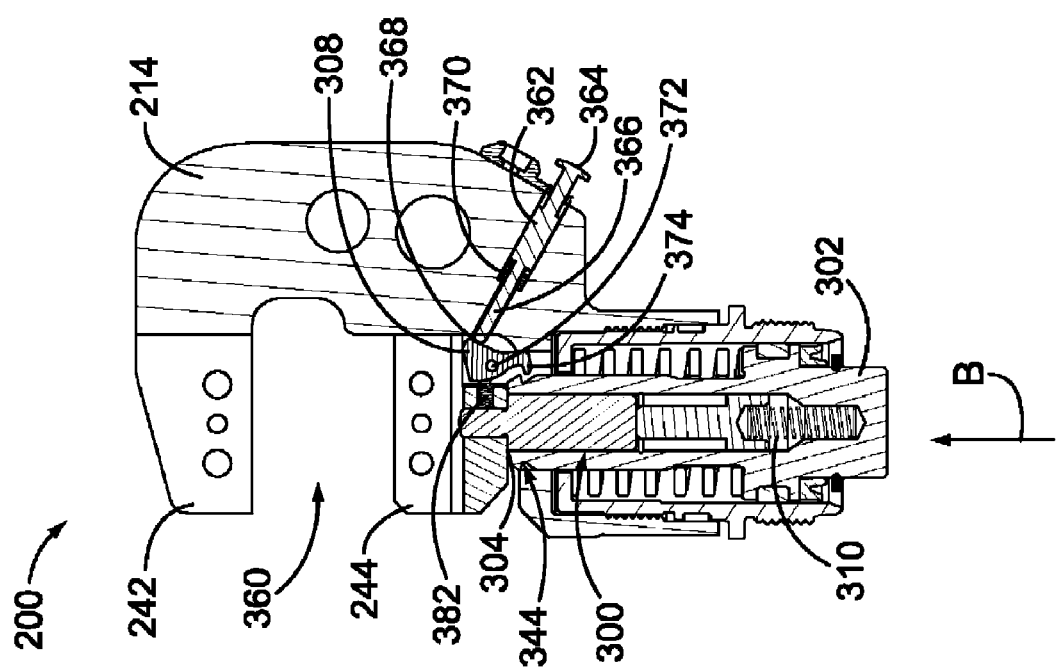

FIG. 6 illustrates the tool head assembly 200 in various operation stages thereof. FIG. 4 generally illustrates the tool head assembly 200 in an initial position. FIG. 6 generally illustrates the tool head assembly 200 in various stages of operation, defined herein by stages A-C, where stage A represents a latch mechanism release stage; stage B represents a closed gripping stroke stage; stage C represents a final pressing stroke stage. The stages of operation illustrated in FIG. 6 are merely exemplary stages. The pressing device 10 may be operated differently and other stages may supplement or replace the illustrated stages.

In operation, a work piece (not shown) is placed in a space 360 defined between the first jaw 242 and the second jaw 244. The jaws may hold dies or blades (not shown) which are configured for doing the desired work on the work piece. Once the work piece is positioned within the space 360, the operator releases the latch mechanism 308 by pressing a release 362, an example of which is represented at stage A.

In the illustrated embodiment, the release 362 is represented by a pushbutton having a tab 364 and a pin 366 extending from the tab 364 to a distal end 368. Optionally, the release 362 is spring biased by a spring 370. The release 362 extends through the tool head frame 214 and is generally aligned with the latch mechanism 308. Pressing the release 362 actuates the latch mechanism 308 and releases the latch mechanism 308 from the working piston 302. In an exemplary embodiment, the latch mechanism 308 may be pivoted about a pivot point 372. When pivoted, a latch arm 374 of the latch mechanism 308 is pulled away from the working piston 302 and disengages from the groove 344 that surrounds the working piston 302. In an exemplary embodiment, a spring 382 engages the latch mechanism 308 and generally forces the latch mechanism 308 to a latched position, such as the position illustrated in FIG. 4. The release 362 overcomes the force of the spring 382 when the release 362 is pressed.

When the latch mechanism 308 is moved to the released position, the moving ram 300 is capable of moving with respect to the working piston 302. For example, the moving ram 300 may be forced along the gripping stroke by the gripping spring 310 to the closed position. However, when the latch mechanism 308 is in the latch position, the latch mechanism 308 holds the moving ram 300 in position relative to the working piston 302, such as in the open position. In the illustrated embodiment, the moving ram 300 is illustrated in the open position at stage A, and is illustrated in the closed position at stage B.

In the closed gripping stroke stage (stage B), the gripping spring 310 extends and forces the moving ram 300 to the closed position. In the closed position, the second jaw 244 is positioned proximate to the first jaw 242. The first and second jaws 242, 244 hold the work piece therebetween by a gripping force imparted by the gripping spring 310. Optionally, the gripping force may be a light spring force enough to hold the work piece in position with respect to the first and second jaws 242, 244.

In operation, the tool head assembly 200 is transferred from the initial or normal position illustrated in FIG. 4 to the closed gripping stroke stage when the operator presses the release 362. For example, when the release 362 is pressed the moving ram 300 is automatically moved to the closed position to hold the work piece. When the operator activates the actuator 22 (shown in FIG. 1), the pressing stroke of the working piston 302 begins and progresses through a pressing stroke to a return stroke, in which the working piston 302 returns to the retracted position. As described in further detail below, the latch mechanism 308 engages the working piston 302 during the driving portion of the pressing stroke and/or a return portion of the pressing stroke to automatically move the moving ram 300 to the open position.

During the pressing stroke, the working piston 302 is driven towards the moving ram 300. At some point during the pressing stroke, the working piston 302 engages the latch mechanism 308. For example, when the head end 204 engages the moving ram 300, the latch mechanism 308 engages the catch 346. Further pressing of the working piston 302 drives the moving ram 300 in the pressing direction. For example, the working piston 302 may drive the moving ram 300 in the pressing direction to the final pressing stroke stage (stage C).

In the final pressing stroke stage (stage C), the working piston 302 drives the moving rain 300 along a pressing stroke. The moving ram 300 in turn drives the second jaw 244 along the pressing stroke. Once the pressing stroke is complete, or as the last portion of the pressing stroke, the working piston 302 is returned to the retracted position, such as the position shown at the initial stage (shown in FIG. 4). As the working piston 302 is returned to the retracted position, the latch mechanism 308, which is coupled to the moving ram 300, pulls the moving ram 300 away from the first jaw 242. The moving ram 300 thus returns the second jaw 244 to the open position. The tool head assembly 200 is then ready to receive another work piece between the first and second jaws 242, 244.

A tool head assembly is thus provided which has a release which allows the moving ram and movable die to advance under light spring pressure and grip the work piece prior to crimping or other pressing operation. Because the spring pressure is light, the work piece can be repositioned if it is gripped incorrectly. The tool head assembly may also improve safety during the pressing operation because the operator's fingers do not need to be holding the terminal during the advance of the main piston of the actuator. After the work piece is gripped in place, the pressing device can be actuated to move the working piston and complete the crimp. The tool head assembly also has a latch mechanism positioned adjacent to a moving ram to engage a catch on the working piston at the end of the crimp stroke. The latch mechanism couples the moving ram and the working piston to one another. Thus, the return stroke of the working piston moves the moving rain and associated movable die to the open position and frees the completed, crimped terminal. Thus, the tool head assembly has a terminal pre-gripping feature and an automatically open on return stroke feature.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:

1. A tool head assembly for a pressing device, the tool head assembly comprising:
   a tool head frame having a first die;
   a moving ram having a second die operatively coupled to the moving ram, the moving ram operable between an open position and a closed gripping position along a gripping stroke, wherein the dies are configured to hold a work piece therebetween when the moving ram is in the closed gripping position; and
   a latch mechanism, wherein the latch mechanism is actuated to release the moving ram from the open position to the closed gripping position to hold the work piece within the tool head assembly.

2. The tool head assembly of claim 1, further comprising a gripping spring biased against the moving ram to force the moving ram along the gripping stroke when the latch mechanism is actuated, the gripping spring holding the moving ram in the closed gripping position.

3. The tool head assembly of claim 1, further comprising a working piston having a central bore, the moving ram received in the central bore and movable with respect to the working piston along the gripping stroke, the working piston being driven along a pressing stroke by the pressing device.

4. The tool head assembly of claim 1, further comprising a working piston being driven along a pressing stroke, the working piston having a catch, wherein the latch mechanism is configured to engage the catch and wherein the latch mechanism is releasable from the catch to release the moving ram along the gripping stroke.

5. The tool head assembly of claim 1, further comprising a release coupled to at least one of the tool head frame and the moving ram, the release has an end that engages the latch mechanism to actuate the latch mechanism when the release is pressed.

6. The tool head assembly of claim 1, wherein the moving ram includes a post, the tool head assembly further comprises a plunger that drives the post, and the tool head assembly further comprises a retaining ring restricting movement of the plunger beyond a limit.

7. The tool head assembly of claim 6, further comprising:
   a working piston having a bore, the moving ram is movably received in the bore and the retaining ring is received in the bore; and
   a gripping spring received in the bore between the working piston and the plunger, the gripping spring drives the plunger along the gripping stroke.

8. A tool head assembly for a pressing device, the tool head assembly comprising:
   a tool head frame having a first die;
   a moving ram having a second die, the moving ram movable along a gripping stroke between an open position and a closed gripping position, the second die being configured to hold a work piece between the second die and the first die when the moving ram is in the closed gripping position;
   a working piston having a central bore that receives the moving ram, wherein the moving ram is movable with respect to the working piston along the gripping stroke, the working piston being driven along a pressing stroke by the pressing device; and
   a latch mechanism coupled to the moving ram, wherein the latch mechanism engages the working piston during a return portion of the pressing stroke to automatically move the moving ram to the open position.

9. The tool head assembly of claim 8, wherein the working piston has a catch, the latch mechanism engages the catch during the pressing stroke.

10. The tool head assembly of claim 8, wherein the working piston engages the second die during the pressing stroke, the latch mechanism engages the working piston when the working piston engages the second die.

11. The tool head assembly of claim 8, wherein, prior to initiation of the pressing stroke, the moving ram is released to the closed gripping position in which the second die is spaced apart from a driving end of the working piston, the driving end moves towards the second die when the pressing stroke is initiated.

12. The tool head assembly of claim 8, further comprising a release coupled to at least one of the tool head frame and the moving ram, the release has an end that engages the latch mechanism to actuate the latch mechanism when the release is pressed.

13. The tool head assembly of claim 8, wherein the latch mechanism is actuated to release the moving ram from the open position along the gripping stroke to the closed position to hold the moving ram in the closed gripping position and thereby hold the work piece within the tool head assembly.

14. A pressing device assembly comprising:
an actuator extending to a mating end; and having a working piston being driven along a pressing stroke; and
a tool head assembly coupled to the mating end of the actuator, the tool head assembly comprising a tool head frame having a first die, and a moving ram having a second die, the moving ram being movably coupled to the working piston, and the moving ram being movable between an open position and a closed gripping position, the tool head assembly also comprises a latch mechanism coupled to the moving ram, wherein the latch mechanism engages the working piston during a return portion of the pressing stroke to automatically move the moving ram to the open position.

15. The assembly of claim 14, wherein the latch mechanism is actuated to release the moving ram from the open position, along a gripping stroke, to the closed gripping position to hold the moving ram in the closed gripping position and thereby hold a work piece within the tool head assembly.

16. The assembly of claim 15, wherein the moving ram is movable along the gripping stroke independent of the working piston moving along the pressing stroke.

17. The assembly of claim 14, wherein the actuator is an electrohydraulic actuator.

18. The assembly of claim 14, wherein the actuator body is handheld and includes an activation switch operating the actuator.

19. The assembly of claim 14, wherein the working piston has a catch, the latch mechanism engages the catch during the pressing stroke.

20. The assembly of claim 14, wherein, prior to initiation of the pressing stroke, the moving ram is released to the closed gripping position in which the second die is spaced apart from a driving end of the working piston, the driving end moves towards the second die when the pressing stroke is initiated.

* * * * *